3,558,610
QUINAZOLINONE DERIVATIVES
Hermann Breuer and Erich Cohnen, Regensburg, and Egon Roesch, Tegernheim, Germany, assignors to E. R. Squibb & Sons, Inc., New York, N.Y., a corporation of Delaware
No Drawing. Filed Dec. 18, 1967, Ser. No. 691,176
Claims priority, application Germany, Dec. 30, 1966, P 16 70 416.8
Int. Cl. C07d 87/16
U.S. Cl. 260—240                                    7 Claims

ABSTRACT OF THE DISCLOSURE

This invention relates to new quinazolinone derivatives having the general formula

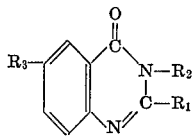

compounds which are useful as antiinflammatory agents and antimicrobial agents.

SUMMARY OF THE INVENTION

This invention relates to new compounds having the formula (I)

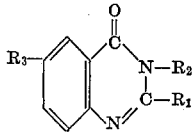

wherein $R_1$ is phenyl, styryl, lower alkoxystyryl, pyridylvinyl or phenyl-lower alkylene;

$R_2$ is lower alkyl, phenyl, lower alkylphenyl, cycloalkyl of 3 to 6 carbon atoms, phenyl-lower alkylene, hydroxy-lower alkylene, di-lower alkylamino-lower alkylene or carboxy-lower alkylene and alkali salts thereof;

$R_3$ is amino, lower alkanoylamino, benzylideneamino or nitrofurylideneamino.

The various lower alkyl and lower alkylene groups in the substituents represented by $R_1$ and $R_2$ are all straight or branched chain hydrocarbon groups of up to about 7 carbon atoms. The lower alkoxy and lower alkanoyl groups are ether and acyl groups, respectively, having carbon chains of the same character.

Particularly characteristic of the new compounds is the presence of a phenyl group in the 2-position. Prefered are those compounds wherein $R_1$ is phenyl and especially phenyl attached to a two carbon chain either saturated or unsaturated. Also preferred are those compounds wherein $R_2$ is tolyl and $R_3$ is benzylideneamino or furfurylideneamino.

The compounds of this invention are useful as antiinflammatory agents, for example, to reduce local inflammatory conditions, e.g., of an edematous nature, in animals such as rats, when given orally in dosages of about 1 to 10 mg./kg. per day. The compounds of Formula I are antimicrobial agents useful to combat organisms such as S. aureus, S. schottmuelleri, P. aeruginosa, S. pyrogenes, E. coli, T. mentagrophytes or the like and may be used as surface disinfectants being incorporated in conventional aqueous or inert solid compositions for spraying or dusting containing about 0.01 to 1% of active ingredient. They may be incorporated in cleansing compositions, e.g., for barn and dairy equipment. The compounds of Formula I wherein $R_2$ is nitrofurylideneamino are especially preferred as antimicrobial agents.

The novel compounds of this invention may be produced by several methods. The symbols in the following formulas have the same meanings as defined above, A quinazolinone derivative of the formula (II)

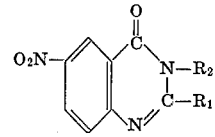

may be used as starting material. The nitro group is reduced to an amino, e.g., by catalytic hydrogenation using a catalyst such as Raney nickel. Then, if desired, an acyl group may be introduced into the amino group by reaction with an acid anhydride, or a benzylidene group by reaction with benzaldehyde in the pressence of zinc chloride, or a nitrofurfurylidene group by reaction with a nitrofurfural such as 5-nitrofurfural. If $R_1$ contains a double bond this may be reduced to a saturated linkage, e.g., by catalytic hydrogenation. When $R_2$ is to be a di-lower alkylamino-lower alkylene group, $R_2$ is initially a halogen atom in Formula II and this is replaced by reaction with a dialkylaminoalkyl halide.

Compounds of this invention may also be made from benzoxazinone derivatives of the formula (III)

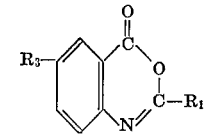

by reaction with an amine of the formula (IV)             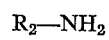 $R_2$—$NH_2$ in a medium which splits off water. Similar conversions as in the previous method may be effected, e.g., when $R_3$ is an amino group or when $R_1$ is unsaturated.

Anthranilic acid derivatives of the formula (V)

R₃—⟨ ⟩—CO—NH—R₂
    ⟨ ⟩—NH—CO—R₁ may also be used as starting materials by splitting off water.

When $R_3$ is benzylideneamino and $R_1$ has a vinyl group connecting the phenyl group to the ring, a compound of the formula (VI)

H₂N—⟨ ⟩—C(=O)—N—R₂
              ⟩—C—CH₃
              N may be reacted with an aromatic aldehyde such as benzaldehyde, preferably in the presence of an agent which splits off water.

The following examples are illustrative of the invention.

EXAMPLE 1

25 grams of 2-phenyl-3-methyl-6-nitro-4(3H)-quinazolinone are dissolved in 400 ml. of tetrahydrofuran and catalytically hydrogenated in the presence of Raney nickel at room temperature and normal pressure. At the completion of hydrogen uptake, the solution is separated from the catalyst by filtration and concentration to a volume of about 80 ml. 18 grams of 2-phenyl-3-methyl-6-amino-4(3H)-quinazolinone crystallizes. The substance has a melting point of 198–199° C.

The starting material may be produced in the following manner:

(a) 47 grams of 2-benzoylamino-5-nitrobenzamide (M.P. 233–234° C., produced from 5-nitroanthranilamide and benzoyl chloride in dioxane in the presence of pyridine), are suspended in 2 liters of hot water with stirring. The suspension is treated with 242 ml. of 2 N sodium hydroxide solution and stirred until a clear solution is obtained. The hot solution is treated with glacial acetic acid. The precipitated 2-phenyl-6-nitro-4(3H)-quinazolinone is filtered under suction, washed with water and dried. The yield amounts to 28.3 gms. The melting point lies between 310 and 312° C.

(b) 38 grams of 2-phenyl-6-nitro-4(3H)-quinazolinone are suspended in 250 ml. of ethanol and the suspension is treated with 157 ml. of 1 N sodium methylate solution. To the resulting yellow-brown solution are added 40.5 gms. of methyl iodide and this is refluxed for 2½ hours. A yellow precipitate results which after cooling, is filtered under suction, then mixed with water, again filtered under suction and dried. 34.3 grams of crude product are obtained.

The 2-phenyl-3-methyl-6-nitro-4(3H)-quinazolinone is recrystallized from methylene glycol monomethyl ether and melts at 185–191° C.

EXAMPLE 2

22 grams of 2,3-diphenyl-6-nitro-4(3H)-quinazolinone are catalytically hydrogenated in the same manner as in Example 1. 20 grams of 2,3-diphenyl-6-aminoquinazolinone-4 are obtained which, after recrystallization from methanol, melt at 226–227° C.

The starting material is prepared in the following manner.

(a) 25.7 grams of 5-nitroanthranilanilide are dissolved in 150 ml. of dioxane at 70° C. 18 ml. of pyridine and then 15.5 grams of benzoyl chloride are added. Upon cooling, a white crystalline slurry forms. This is treated with about 1 liter of water and the crude product (39 g.) is then filtered under suction and recrystallized from methylene glycol monomethyl ether. The 2-benzoylamino-5-nitroanthranilanilide melts at 257–259° C.

(b) 5 grams of 2-benzoylamino-5-nitroanthranilanilide are heated in an oil bath at 250° for one hour whereby water is driven off. The residue is recrystallized from methylene glycol monomethyl ether. 4 grams of 2,3-diphenyl-6-nitro-4(3H)-quinazolinone, which melts at 227–228° C., are obtained.

EXAMPLE 3

5.25 grams of 2-phenyl-3-methyl-6-amino-4(3H)-quinazolinone are brought into solution in 150 ml. of methanol by heating. A solution of 2.7 grams of 5-nitrofurfural in 50 ml. of methanol are added. After a short time 2-phenyl-3 - methyl - 6 - (5-nitrofurfurylideneamino)-4(3H)-quinazolinone precipitates in almost quantitative yield, M.P. 251° C. with dec.

EXAMPLE 4

24.1 grams of 2-benzoylamino-5-nitrobenzamide are suspended in 1100 ml. of hot water (80° C.) and the suspension is treated with 138 ml. of 2 N sodium hydroxide solution. The suspension is stirred until a clear yellow solution results. Upon cooling, the sodium salt of 2-phenyl-6-nitro-4(3H)-quinazolinone crystallizes.

This aqueous suspension is hydrogenated in the presence of Raney nickel catalyst, whereupon after the conclusion of hydrogen uptake an almost colorless solution results, which is quickly filtered off from the catalyst and acidified with acetic acid. The precipitate is filtered under suction and washed with water. 15.5 grams of 2-phenyl-6-amino-4(3H)-quinazolinone are obtained, M.P. 273–274° C.

EXAMPLE 5

11.8 grams of 2-phenyl-6-amino-4(3H)-quinazolinone are dissolved in 150 ml. of methylene glycol monomethyl ether with warming. After filtering off a light turbidity, 7.5 grams of 5-nitrofurfural are added all at one time with stirring. After a short time a yellow-orange colored precipitate forms. This is stirred for an additional 15 minutes, cooled, filtered under suction, and then washed with ethanol. 14 grams of 2-phenyl-6-[(5-nitrofurfurylidene) amino]-4(3H)-quinazolinone are obtained, M.P. 284° C. with dec.

EXAMPLE 6

37 grams of 2-styryl-3-phenyl-6-nitro-4(3H)-quinazolinone are suspended in 800 ml. of dioxan and after the addition of 2 ml. of glacial acetic acid are hydrogenated in the presence of Raney nickel at normal pressure and room temperature.

After the amount of hydrogen required for the reduction of the nitro group to the amino group is taken up, the catalyst is filtered off and the solution is concentrated in vacuo. The at first syrup-like residue is treated with a little ethanol whereupon it crystallizes. This is filtered under suction and recrystallized from dioxan. The yield amounts to 29.3 grams of 2-styryl-3-phenyl-6-amino-4(3H)quinazolinone, M.P. 233–235° C.

The 2 - styryl - 3 - phenyl-6-nitro-4(3H)-quinazolinone used as starting material may be prepared in the following manner:

70.8 grams of 2-methyl-3-phenyl-6-nitro-4(3H)-quinazolinone and 47.7 grams of benzaldehyde are heated to 200° C. To the homogeneous melt are added 4.7 grams of zinc chloride. A vigorous reaction immediately occurs and the water formed in the condensation evolves. After a short time the reaction product crystallizes. After cooling, this is triturated with a little ethanol and filtered under suction. This is crystallized from methylene glycol monomethyl acetate to obtain 71.8 grams of 2-styryl-3-phenyl-6-nitro-4(3H)-quinazolinone, M.P. 273–275° C.

EXAMPLE 7

By the procedure of Example 6, there is obtained from 2 - styryl-3-o-tolyl - 6 - nitro-4(3H)-quinazolinone (M.P. 278–280° C.) by catalytic hydrogenation 2-styryl-3-o-tolyl-6-amino-4(3H)-quinazolinone, M.P. 220–221° C.

EXAMPLE 8

By the procedure of Example 6, there is obtained from 2-β-(p-methoxyoxyphenyl)vinyl-3-phenyl-6-amino - 4(3H)-quinazolinone, (M.P. 313° C.), by catalytic hydrogenation 2-β-(p-methoxyphenyl)vinyl-3-phenyl - 6 - amino - 4(3H)-quinazolinone, M.P. 254–256° C.

EXAMPLE 9

By the procedure of Example 6, there is obtained from 2 - β - (2 - pyridyl)vinyl-3-phenyl-6-nitro-4(3H) - quinazolinone, M.P. 268–271° C.) 2-β-(2-pyridyl)vinyl-3-phenyl-6-amino-4(3H)-quinazolinone, M.P. 256–258°.

EXAMPLE 10

10 grams of 2 - β - phenylvinyl-3-o-tolyl-6-nitro-4(3H)-quinazolinone are suspended in 200 ml. of dioxan, the suspension is treated with 1 ml. of glacial acetic acid and, after the addition of Raney nickel catalyst, is hydrogenated until hydrogen uptake is completed. The hydrogen uptake, which markedly slows down when the amount necessary for the reduction of the nitro group to the amino group is absorbed, stops after the absorption of 2.6 liters of hydrogen. The catalyst is filtered off and the solvent is distilled off. The residue is crystallized by trituration with ethanol. After recrystallization from toluene, there are obtained 5.5 grams of 2-β-phenethyl-3-o-tolyl-6-amino-4(3H)-quinazolinone, M.P. 189–192° C.

EXAMPLE 11

10 grams of 2-styryl-3-phenyl-6-amino-4(3H)-quinazolinone are dissolved in 100 ml. of pyridine with warming and the solution is again cooled to room temperature. 20 ml. of acetic anhydride are added whereupon the solution becomes warm. The crystals which separate shortly thereafter, after standing for several hours in the refrigerator, are filtered under suction, washed with pyridine and ethanol and dried. There are obtained 8.6 grams of 2-styryl-3-phenyl - 6 - acetamino - 4(3H)-quinazolinone, M.P. 321–322° C.

EXAMPLE 12

20 grams of 2-methyl-3-phenyl-6-amino-4(3H)-quinazolinone are finely ground with 1.54 grams of water-free zinc chloride, mixed with 30 grams of benzaldehyde and the mixture is heated in an oil bath at 180° for 15 minutes. After cooling, the reaction is triturated with alcohol and filtered under suction. 27.9 grams of 2-styryl-3-phenyl-6-benzylideneamino-4(3H)-quinazolinone are obtained, 220–222° C. After recrystallization from methylene glycol monomethyl ether the substance melts at 223–224° C.

EXAMPLE 13

By the procedure of Example 12, there is obtained from 2 - methyl - 3 - o-tolyl-6-amino-4(3H)-quinazolinone and benzaldehyde 2 - styryl - 3 - o-tolyl-6-benzylideneamino-4(3H)-quinazolinone, M.P. 181–183° C.

EXAMPLE 14

22.5 grams (60 mM.) of 2-styryl-3-cyclohexyl-6-nitro-4(3H)-quinazolinone are added with cooling to 90 ml. (180 mM.) of a tin (II) chloride-glacial acetic acid solution (225 gms. $SnCl_2 \cdot 2H_2O$ and 100 gms. of HCl gas dissolved in 250 ml. of glacial acetic acid and brought up to 500 ml. with glacial acetic acid). The reaction mixture becomes warm. After cooling, the reaction mixture is stirred for an additional hour. Acetic acid and HCl gas are evaporated in vacuo. The residue is suspended in 2 N HCl, filtered, washed with 2 N HCl, finally digested with 15% sodium hydroxide solution and washed with water. After recrystallization from ethyl glycol there are obtained 13.0 grams 2-styryl-3-cyclohexyl-6-amino-4(3H)-quinazolinone, M.P. 239–242° C.

The preparation of the starting materials may be accomplished in the following manner:

24.4 grams (85 mM.) of 2-methyl-2-cyclohexyl-6-nitro-4(3H)-quinazolinone and 18.4 grams (17.0 mM.) of benzaldehyde are heated at 180–200° C. with about 1 gm. of zinc chloride for 5 to 10 minutes. After cooling the reaction mixture is triturated with ethanol, the residue is filtered and washed with ethanol. The crude yield is 26.0 gms. of 2-styryl-3-cyclohexyl-6-nitro-4(3H)-quinazolinone, M.P. 228–231° C.

The following additional compounds are illustrative:

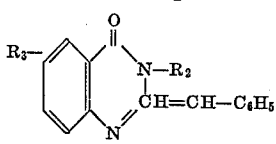

| $R_2$ | $R_3$ | M.P., ° C. |
|---|---|---|
| H | $NH_2$ | [1] 277–280 |
| $CH_3$ | $NH_2$ | 195–196 |
| $CH_2\text{—}C_6H_5$ | $NH_2$ | 213–214 |
| $CH_2CH_2OH$ | $NH_2$ | 192–196 |
| $CH_2CH_2N(C_2H_5)_2$ | $NH_2$ | 220–224 |
| ⟨H⟩ (cyclohexyl) | $NH_2$ | 239–242 |
| $CH_2COONa$ | $NH_2$ | 320 |

[1] Hydrochloride.

What is claimed is:
1. A compound of the formula

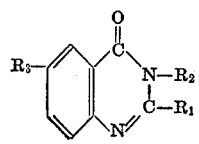

wherein $R_1$ is phenyl, styryl, lower alkoxystyryl, pyridylvinyl or phenyl-lower alkylene; $R_2$ is lower alkyl, phenyl, lower alkyl phenyl, cycloalkyl of 3 to 6 carbon atoms, phenyl-lower alkylene, hydroxy-lower alkylene, di-lower alkylamino-lower alkylene, or carboxy-lower alkylene and alkali salts thereof; and $R_3$ is 5-nitrofurfurylideneamino.

2. A compound of the formula

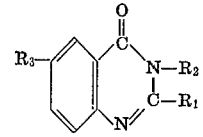

wherein $R_1$ is phenyl, styryl, lower alkoxystyryl, pyridylvinyl or phenyl-lower alkylene; $R_2$ is lower alkyl, phenyl, lower alkyl phenyl, cycloalkyl of 3 to 6 carbon atoms, phenyl-lower alkylene, hydroxy-lower alkylene, di-lower alkylamino-lower alkylene, or carboxy-lower alkylene and alkali salts thereof; and $R_3$ is benzylideneamino.

3. A compound of the formula

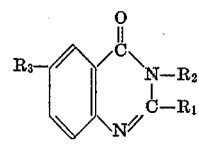

wherein $R_1$ is phenyl, $R_2$ is lower alkyl, phenyl, lower alkyl phenyl, cycloalkyl of 3 to 6 carbon atoms, phenyl-lower alkylene, hydroxy-lower alkylene, di-lower alkylamino-lower alkylene, or carboxy-lower alkylene and alkali salts thereof; and $R_3$ is amino, lower alkanoylamino, benzylideneamino or 5-nitrofurfurylideneamino.

4. A compound as in claim 1 wherein $R_1$ is phenyl and $R_2$ is methyl.

5. A compound as in claim 1 wherein $R_1$ is phenyl and $R_2$ is hydrogen.

6. 2β - phenethyl - 3 - o - tolyl - 6 - amino - 4(3H) - quinazolinone.

7. A compound of the formula

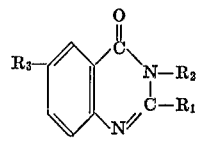

where $R_1$ is phenyl, styryl, lower alkoxystyryl, pyridylvinyl or phenyl-lower alkylene; $R_2$ is lower alkyl, phenyl, lower alkyl phenyl, cycloalkyl of 3 to 6 carbon atoms, phenyl-lower alkylene, hydroxy-lower alkylene, di-lower alkylamino - lower alkylene, or carboxy - lower alkylene and alkali salts thereof; and $R_3$ is lower alkanoylamino.

References Cited

UNITED STATES PATENTS 3,462,434  8/1969  Heusner et al. _____ 260—256.4

FOREIGN PATENTS 1,678  2/1963  France _____ 260—256.4
916,139  1/1963  Great Britain _____ 260—256.4

OTHER REFERENCES

Boltze et al. Arzneimittel-Forsch. 13 (8), 688–701 (1963).

Dhatt, Current Sci. 30, 179–80 (1961).

Stedman's Medical Dictionary, Illustrated, 17th Revised Edition, The Williams & Wilkens Co., Baltimore, Md., 1949, pp. 77, 272–3, 1106.

HENRY R. JILES, Primary Examiner

G. T. TODD, Assistant Examiner

U.S. Cl. X.R.

260—244, 256.4; 424—251